(12) United States Patent
Venkatachalam et al.

(10) Patent No.: US 7,898,459 B2
(45) Date of Patent: Mar. 1, 2011

(54) ADAPTIVE SPECIFIC DIFFERENTIAL PHASE IN DUAL-POLARIZATION RADAR

(75) Inventors: Chandrasekaran Venkatachalam, Fort Collins, CO (US); Yanting Wang, Aurora, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 143 days.

(21) Appl. No.: 12/382,000

(22) Filed: Mar. 16, 2009

(65) Prior Publication Data

US 2009/0315762 A1 Dec. 24, 2009

Related U.S. Application Data

(60) Provisional application No. 61/036,682, filed on Mar. 14, 2008.

(51) Int. Cl.
*G01S 13/95* (2006.01)
(52) U.S. Cl. .............. 342/26 R; 342/188; 342/194; 342/195
(58) Field of Classification Search ............ 342/26 R, 342/26 A–26 D, 188, 194, 195
See application file for complete search history.

(56) References Cited

U.S. PATENT DOCUMENTS

| | | | | |
|---|---|---|---|---|
| 4,369,519 A | * | 1/1983 | Yuuki et al. ............ | 455/60 |
| 5,500,646 A | | 3/1996 | Zrnic | |
| 6,061,013 A | | 5/2000 | Sauvageot et al. | |
| 6,473,026 B1 | * | 10/2002 | Ali-Mehenni et al. ..... | 342/26 R |
| 7,495,599 B2 | * | 2/2009 | Andersson et al. ........ | 342/26 R |
| 7,518,544 B2 | * | 4/2009 | Venkatachalam et al. ..... | 342/59 |
| 7,583,222 B2 | * | 9/2009 | O'Hora et al. ............ | 342/26 R |
| 7,652,614 B2 | * | 1/2010 | Venkatachalam et al. . | 342/26 R |
| 2005/0093734 A1 | * | 5/2005 | Alford et al. .............. | 342/26 R |
| 2007/0152867 A1 | * | 7/2007 | Randall .................... | 342/26 R |
| 2009/0224965 A1 | * | 9/2009 | Venkatachalam et al. . | 342/26 R |
| 2009/0315762 A1 | * | 12/2009 | Venkatachalam et al. . | 342/26 R |
| 2010/0090884 A1 | * | 4/2010 | Venkatachalam et al. ... | 342/159 |

OTHER PUBLICATIONS

International Application No. PCT/US2009/037305, International Search Report and Written Opinion, 12 pages, Aug. 17, 2009.
Brandes, Edward A. et al., "An Evaluation of Radar Rainfall Estimates From Specific Differential Phase," American Meteorological Society, pp. 363-375, Mar. 2001.
Gorgucci, Eugenio et al., "Practical Aspects of Radar Rainfall Estimation Using Specific Differential Propagation Phase," American Meteorological Society, pp. 945-955, Jun. 2000.
Zahrai, Allen et al., "Implementation of Polarimetric Capability for the WSR-88D (Nexrad) Radar," IEEE, pp. 346-351, 1997.
Zrnic, Dusan S. et al., "Enhanced Polarimetric Radar Signatures Above The Melting Level in a Supercell Storm," IEEE, pp. 296-298, 2002.

\* cited by examiner

*Primary Examiner*—John B Sotomayor
(74) *Attorney, Agent, or Firm*—Townsend and Townsend and Crew LLP

(57) ABSTRACT

Systems and methods are provided for adaptively estimating the specific differential phase ($K_{dp}$) from dual-polarization radar data in the complex domain. Some embodiments adapt for wrapped differential propagation phases by estimating the specific differential phase in the complex domain. Some embodiments adapt for measurement fluctuations and/or spatial scale in making such estimations. Some embodiments also provide for determining the presence of storms cells using the dispersion of the differential propagation phase shift over a subset of bins.

30 Claims, 7 Drawing Sheets
(4 of 7 Drawing Sheet(s) Filed in Color)

ADAPTIVE SPECIFIC DIFFERENTIAL PHASE IN DUAL-POLARIZATION RADAR

CROSS-REFERENCES TO RELATED APPLICATIONS

This application is a nonprovisional of, and claims the benefit of, U.S. Provisional Patent Application Ser. No. 61/036,682, entitled "SPECIFIC DIFFERENTIAL PHASE IN DUAL-POLARIZATION RADAR," filed Mar. 14, 2008, the entire disclosure of which is incorporated herein by reference for all purposes.

FEDERALLY SPONSORED RESEARCH AND DEVELOPMENT

This invention was made with Government support through the National Science Foundation ITR Program, ATM-0121546.

BACKGROUND

Dual polarization radars send and receive electromagnetic waves with two polarizations as shown in FIG. 1. These polarizations can be orthogonal; for example, with horizontal and vertical polarizations. A dual polarization radar can measure differential propagation phase shift ($\Phi_{Dp}$) between the two polarizations. The specific differential phase ($K_{dp}$), defined as the slope of the differential propagation phase shift ($\Phi_{Dp}$) with respect to range, can be an important parameter for weather radar applications. Estimation of the specific differential phase can require computing the numerical derivative of range profiles of the differential propagation phase. The existence of possible phase wrapping, noise and/or statistical fluctuation in the differential propagation phase have made the evaluation of the specific differential phase an unstable numerical process.

BRIEF SUMMARY

A dual-polarization radar system is provided according to one embodiment, including a dual polarization radar receiver, a processor, and memory. The memory can be configured to store information including raw data received from the receiver, data processed by the processor, and processing code executable by the processor. In some embodiments, the processing code can include instructions to receive raw dual polarization data as a function of range from the dual polarization receiver. The processing code can include instructions to determine a differential propagation phase shift as a function of range from the raw dual polarization data. The processing code can also include instructions to estimate the complex specific differential phase from the differential propagation phase shift by estimating the derivative of the differential phase shift data with respect to range in the complex domain.

A method for determining the presence of storm cell from differential propagation phase shift data is also provided. The method includes receiving range profiles of differential propagation phase shift data from a radar system. The range profiles of differential propagation phase shift data can include an array of differential propagation phase shift data arranged in bins corresponding to range. The dispersion of the differential propagation phase shift data can be evaluated and examined at each bin (where the dispersion in some embodiments can be defined formally in equation 24). When the dispersion at a first consecutive subset of bins is greater than a first threshold, it can indicate the first bin within the first consecutive subset of bins as the start of a rain cell. When the dispersion at a second consecutive subset of bins is less than a second threshold, it can indicate the first bin within the second consecutive subset of bins as the end of the rain cell.

A method for determining the presence of storm cell from differential propagation phase shift data is also provided. The method includes receiving range profiles of differential propagation phase shift data from a radar system. The range profiles of differential propagation phase shift data can include an array of differential propagation phase shift data arranged in bins corresponding to range. A first dispersion can be calculated over a first consecutive subset of the bins; and when the first dispersion is greater than a first threshold, indicating the first bin within the first consecutive subset of bins as the start of a rain cell. A second dispersion can be calculated over a second consecutive subset of the bins; and when the second dispersion is less than a second threshold, indicating the first bin within the second consecutive subset of bins as the end of the rain cell.

In some embodiments, the first threshold and the second threshold are the same. In some embodiments, the first threshold and/or the second threshold equals about 0.98. In some embodiments, the bins between the first bin within the first consecutive subset of bins and the first bin within the second consecutive subset of bins as part of a rain cell.

In some embodiments, a system is also provided that includes means for receiving dual-polarization echo data from a dual polarization radar receiver, means for determining a differential propagation phase shift as a function of range from the raw dual polarization data, and means for determining the complex specific differential phase from the differential propagation phase shift by estimating the derivative of the differential phase shift data with respect to range in the complex domain. The system can also include means for adapting the differential phase shift data for spatial scale. The system can also include means for adapting the differential phase shift data for measurement fluctuations. The system can also include means for determining the presence of storm cells within the differential phase shift data.

Another dual-polarization radar system is provided that includes a dual polarization radar receiver, a processor coupled with the receiver, and memory configured to store information including raw data received from the receiver, data processed by the processor, and processing code executable by the processor. The processing code can include instructions to determine a differential propagation phase shift as a function of range from raw dual polarization data received from the dual polarization receiver. The differential propagation phase shift data can comprises an array of data arranged in bins corresponding to range. The processing code can include instructions for calculating the dispersion of the differential propagation phase shift data over a consecutive subset of the bins. The processing code can include instructions for determining whether a consecutive subset of bins have dispersion greater than a first threshold, and instructions for indicating whether the consecutive subset of bins correspond to the start of a rain cell. The processing code can include instructions for determining whether another consecutive subset of bins have dispersion greater than a second threshold and instructions for indicating whether the consecutive subset of bins correspond to the end of a rain cell.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
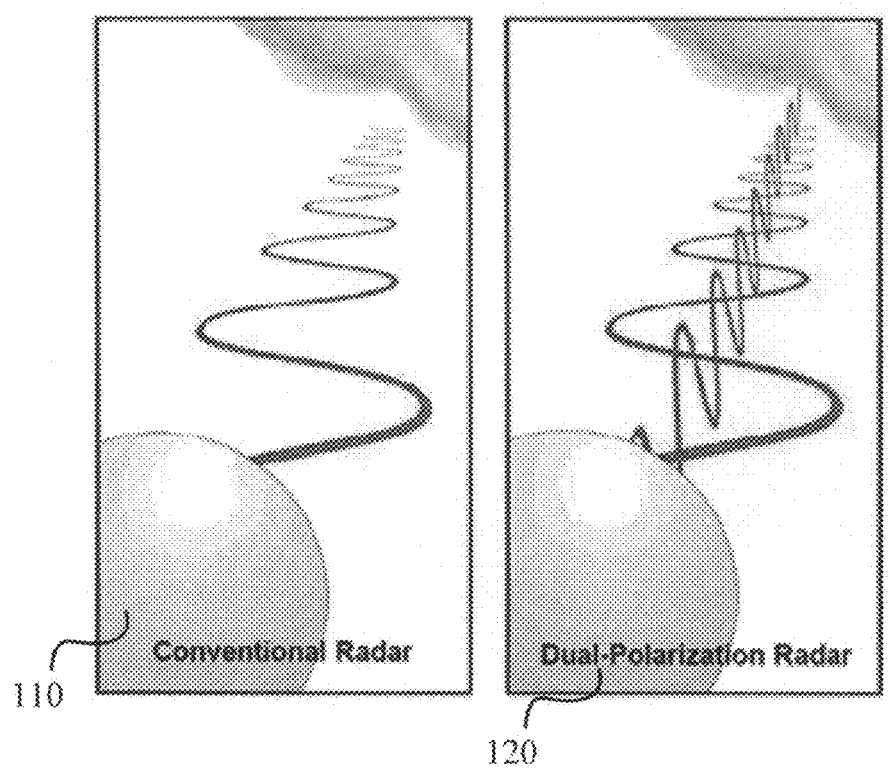
FIG. 1 shows an illustration of a conventional radar system compared with a dual-polarization radar system.

FIG. 1 shows an illustration of a conventional radar system 110 with a single polarization state compared with a dual-polarization radar system 120 (or polarimetric radar system). Dual polarization radar systems 120 can transmit and receive two orthogonal polarization states, often at vertical polarization and horizontal polarization as shown in the figure. Dual-polarization radar systems can provide multi-parameter data including differential reflectivity, co-polar correlation coefficients, linear depolarization ratio and/or specific differential phase.

The differential reflectivity is a power ratio of the reflected horizontally and vertically polarized returns. Among other things, it can be a good indicator of rain drop shape and/or size. The co-polar correlation coefficient $\rho_{hv}$ is a statistical correlation between the reflected horizontally and vertically polarized returns and can be a good indicator of regions where there is a mixture of precipitation types, such as rain and snow. The linear depolarization ratio is a power ratio of the reflected cross-polarized return (a vertically polarized return from horizontal polarization transmission or a horizontally polarized return from vertical polarization transmission) and the reflected co-polarized return and can be a good indicator of regions where mixtures of precipitation types occur.

The specific differential phase $K_{dp}$ can be estimated from range profiles of the differential propagation phase. The specific differential phase measurement has several advantages such as being independent of absolute calibration and/or attenuation, and not being significantly affected by the presence of hail and/or partial beam blockage. The specific differential phase can be a very reliable estimator of rain rate. Some embodiments disclose methods and/or systems that can determine and/or estimate the specific differential phase adaptively and robustly for operational systems.

Some embodiments can be used to estimate the specific differential phase from wrapped differential propagation phase profiles. In some embodiments, the estimation can be performed in the complex domain over the angular phase(s), $\theta$, that can be transformed from the measured differential propagation phase data in its real valued principal form $\Phi_{dp}$, as $$\theta(r) = e^{j\Phi_{dp}(r)}. \tag{1}$$

In some embodiments, the specific differential phase can be determined by the slope of the differential propagation phase shift data over a range. In some embodiments, the specific differential phase can be determined in the complex domain from $$K_{dp}(r) = -\frac{j}{2} e^{-j\Phi_{dp}(r)} \frac{\partial e^{-j\Phi_{dp}(r)}}{\partial r} \tag{2}$$
$$= \frac{1}{2j\theta(r)} \frac{\partial \theta(r)}{\partial r}.$$

The estimation using (2), in some embodiments, can work reliably in the presence of wrapped $\Phi_{dp}$.

Various embodiments provide for storm cell detection within a range profile of differential phase shift data, for adaptation for measurement fluctuations within a range profile of differential phase shift data, and for adaptation for spatial scale within a range profile of differential phase shift data—all in the complex domain. Moreover, an adaptive estimation can return gains with higher resolution and higher accuracy by minimizing the estimate bias and the estimate variance accordingly. In some embodiments, the adaptive estimation can ensure that the estimate reliably captures small scale yet highly intense features and/or large scale yet weak features.

Some embodiments can be used to estimate the slope of measured data along range f(r) by solving the following regression function s(r):

$$L = \min_{s(r)} \left\{ \int |s''(r)|^2 dr + \lambda \sum_{k=1}^{M} |f(r_k) - s(r_k)|^2 \right\}. \tag{3}$$

In the above Lagrangian, $f(r_k)$ is the measured data sample at range bin $r_k$, $\lambda$ is the Lagrangian parameter, and $s(r_k)$ is the model value at range bin $r_k$ of the regression function that is being sought. The first term can be used to evaluate the degree of smoothness. For example, an extreme smoothness occurs when $\lambda=0$, in which case a linear continuous function can be the solution to the minimization. The second term can be used to assess the degree of data fidelity. As $\lambda \to \infty$, the regression function is dictated to pass all the measurement. Other intermediate values of $\lambda$ control the tradeoff between the expected model smoothness and the allowed regression errors. The minimization can be used to put more emphasis on the degree of smoothness if small $\lambda$ is used. By changing the choice of $\lambda$ the solution can balance between estimate bias and estimate variance.

In some embodiments, a cubic spline function can be used as the regression function s(r), which can be written for the k-th interval between nodes $r_k$ and $r_{k+1}$ as, $$s_k(r) = a_k(r-r_k)^3 + b_k(r-r_k)^2 + c_k(r-r_k) + d_k, r \in [r_k, r_{k+1}]. \tag{4}$$

Various other functions can also be used. In some embodiments, the specific differential propagation phase can be assumed to be constant at both ends of a radial profile over a rain cell, which means that the second-order derivatives at end nodes should be zero. This end condition can impose a complete determination of all the coefficients and leads to "natural cubic splines" regression. In some embodiments, the coefficients $d_k$ can correspond to the smoothed angular phase and the coefficients $c_k$ can correspond to its range derivatives. In some embodiments, the specific differential phase can be computed from the regression function at an arbitrary range.

In some embodiments, only the derivatives at the nodes $r_k$ can be required to estimate the specific differential propagation phase, and/or the specific differential phase can be computed as $$\hat{K}_{dp}(r_k) = \frac{1}{2} \operatorname{Im}\left(\frac{c_k}{d_k}\right) \tag{5}$$

Substituting the cubic splines (4) into the regression function (3) the Lagrangian can be written as $$L = \sum_{k=1}^{M-1} \left\{ \frac{4 q_k^2 (r_{k+1} - r_k)}{3} \left[ \begin{array}{c} |b_k|^2 + |b_{k+1}|^2 + \\ \operatorname{Re}(b_k b_{k+1}^*) \end{array} \right] \right\} + \lambda \sum_{k=1}^{M} w_k^2 |f(r_k) - d_k|^2. \tag{6}$$

In some embodiments, the terms q and w are both real valued scaling factors that can be used to balance between bias and variance and can be selectively controlled for different segments. In some embodiments, the parameter q can be used to compensate for the variation in slope, i.e., $K_{dp}$; the parameter w can be used to compensate for the statistical fluctuation of the differential propagation phase profiles.

Figure 2:
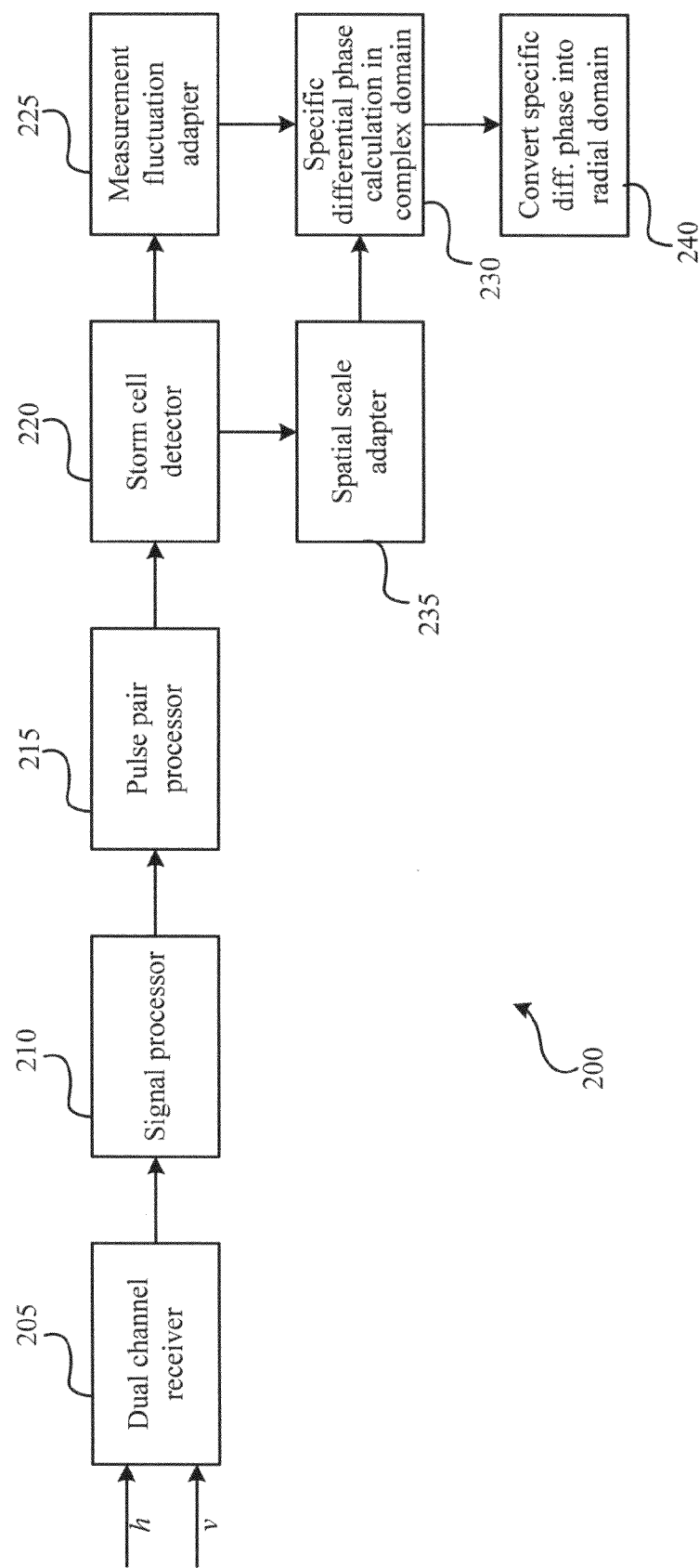
FIG. 2 shows a block diagram of a system for determining the specific differential phase in a dual-polarization radar according to some embodiments.

FIG. 2 shows a block diagram of a system 200 for determining the specific differential phase from dual-polarization radar measurements according to some embodiments. The blocks shown in FIG. 2 can be functional blocks. As such, all or a portion of the functions performed in each block can be performed within a single device or functional blocks within a computer program code. In other embodiments, some or each of the functions performed in the blocks can be performed in separate devices or processors. Moreover, the functionality in blocks, collectively or individually, can be recorded in a computer readable medium that can be executed within a computer system.

Dual polarization radar signals can be received from a polarimetric radar using dual channel receiver 205. The dual polarization radar signals can be received at both the horizontal polarization state and vertical polarization state. The dual polarization radar signals can be measured by the dual channel receiver 205 in the simultaneous horizontal/vertical transmission mode or in the alternative horizontal/vertical transmission mode. The raw dual polarization radar data received by the dual channel receiver 205 can include an array of bins recording echoes in both polarization states where each bin corresponds with target range.

The dual polarization radar data can be sent from dual channel receiver 205 to signal processor 210. Signal processor 210 can perform filtering, equalization, enhancement, detection, digitization, clutter cancelation, noise reduction, etc. of the dual polarization data.

The dual polarization data can then be sent to pulse pair processor 215. The pulse pair processor can convert the digitized samples at both polarization states into polarimetric radar variables, including the co-polar correlation coefficient $\rho_{hv}$ and the differential propagation phase shift data $\Phi_{dp}$. The differential propagation phase shift data can be recorded in the complex domain as angular phases $\theta$. For example, the differential propagation phase shift data can take on the complex form from the co-polar correlation $$\frac{\langle h^* \cdot v \rangle}{\sqrt{\langle |h|^2 \rangle + \langle |v|^2 \rangle}} = \rho_{hv}(r) e^{j\Phi_{dp}(r)} = \rho_{hv}(r) \vartheta(r), \tag{7}$$

where h and v can be the digitized signal samples at the horizontal polarization and the vertical polarization respectively, and $\Phi_{dp}(r)$ represents the phase difference between the two polarizations as a function of range.

In some embodiments, the estimation of specific differential phase involves estimating slopes of $\Phi_{dp}(r)$ profiles which is a numerically unstable process. Evaluation of a derivative can be considered high-pass filtering and it expects a smooth and continuous function as the input. The fluctuation in the differential propagation phase shift data can be magnified during the process and large variance can exist in the estimates of the specific differential phase data. Furthermore, phase wrapping may occur in the differential propagation phase shift data making the evaluation meaningless at phase shift discontinuities.

Figure 3:
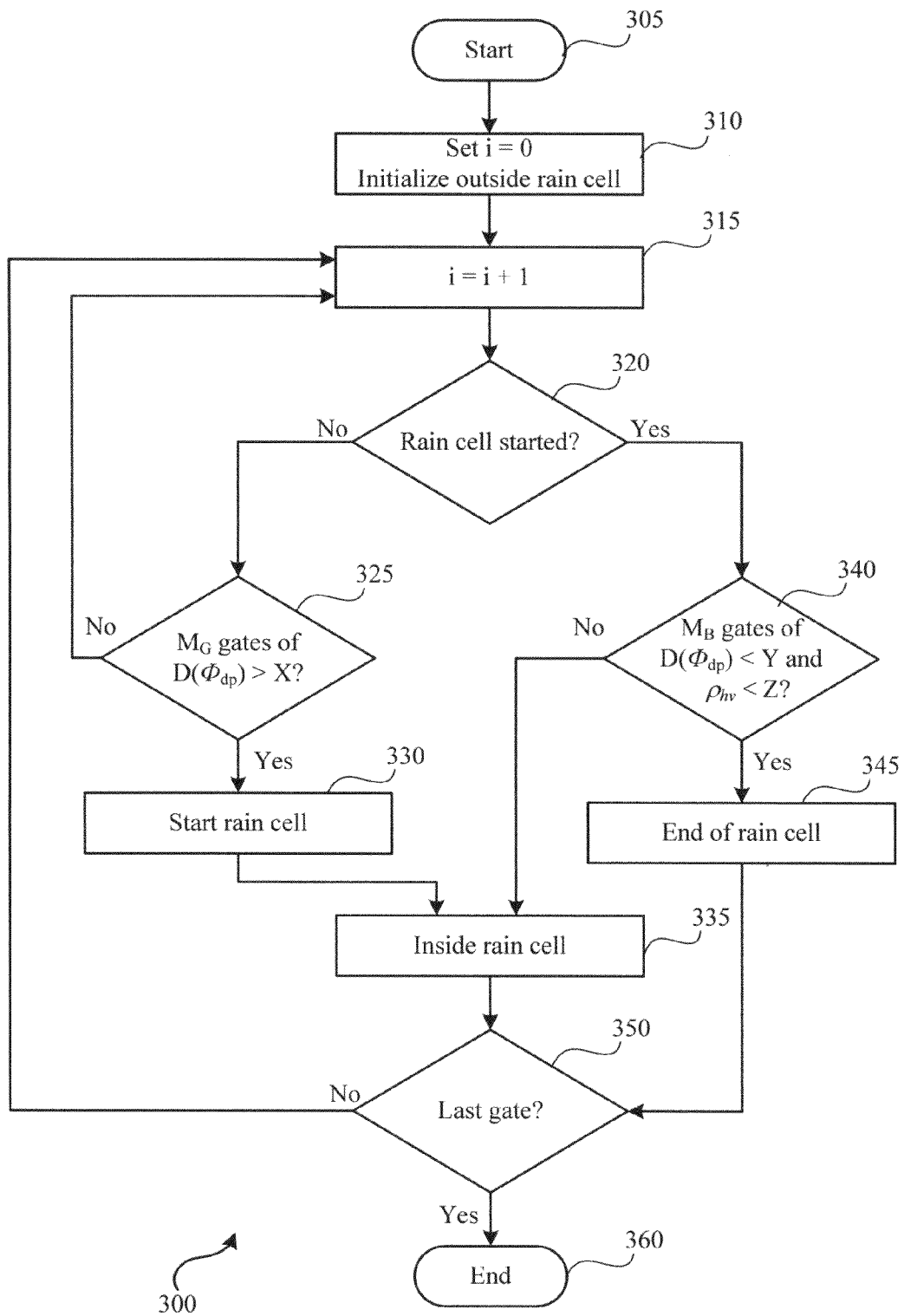
FIG. 3 shows a flow chart for detecting storm cells from range profiles of the differential propagation phase shift according to some embodiments.

The differential propagation phase shift data can be sent from pulse pair processor 215 to storm cell detector 220. In some embodiments, storm cell detector 220 can determine the portions of the data corresponding to a storm cell. FIG. 3 shows a flow chart of a process for determining the presence of storm cells within the differential propagation phase shift data in the complex domain according to some embodiments.

At block 225 the data can be adapted for measurement fluctuations. In some embodiments, parameter w can be chosen to adapt for measurement fluctuations. For example, parameter w can be set as the inverse of the standard deviation of the angular $\Phi_{dp}$ such that the variation is normalized. The variance of $\exp\{j\Phi_{dp}\}$ can be evaluated as:

$$w^{-2} = E[|e^{j\Phi_{dp}}|^2] - |E[e^{j\Phi_{dp}}]|^2 = 1 - |E[e^{j\Phi_{dp}}]|^2. \tag{8}$$

The maximum variation can occur when noise dominates, in which case $\Phi_{dp}$ distributes uniformly between $-\pi$ and $\pi$, and it follows that $w^{-2}=1$. In some embodiments, when the variation in the angular $\Phi_{dp}$ is small, Taylor expansion can be used to approximate (8) as $$w^{-2} \approx 1 - \left(1 - \frac{1}{2}\sigma_\phi^2\right)^2 \approx \sigma_\phi^2. \tag{9}$$

The variance $\sigma_\varphi^2$ can be evaluated from the Doppler spread and the co-polar correlation coefficient. In some embodiments, it can be approximated for large $\rho_{hv}$ as $$w^{-2} \approx \frac{1}{2}\left(\frac{1}{|\rho_{hv}|^2} - 1\right) \approx 1 - |\rho_{hv}|. \tag{10}$$

Thus, in some embodiments, block 225 can determine the appropriate approximation of w depending on the value of $\rho_{hv}$. In doing so the data can be adapted for measurement fluctuations.

At block 235 the data can also be adapted for spatial scale. In some embodiments, spatial scale can be adapted for by determining the parameter q in equation (6). For example, large variations can be allowed such that bias is minimized to avoid excessive smoothness. In some embodiments, the parameter q can be set to $q^{-1}=2K_{dp}$. The parameter q can be estimated from a non-adaptive process as shown in (3) to indicate the relative spatial scale variation along range. Parameter q can be used to compensate for two-way phase shift in $\Phi_{dp}$. In some embodiments, the inverse relationship between parameter q and $K_{dp}$, deemphasizes smoothness at large slopes and heavily weight smoothness at small slopes. In some embodiments, the parameter q can cut off at $K_{dp}$ of 0.1°/km during numerical evaluation.

In some embodiments, based on the angular $\Phi_{dp}$ profile, using $q^{-1}=2K_{dp}$ the smoothness term in (3) can be evaluated as:

$$\frac{|s'(x)|^2}{4K_{dp}^2} = \frac{|je^{j\Phi_{dp}}\Phi_{dp}'' - e^{j\Phi_{dp}}(\Phi_{dp}')^2|^2}{4K_{dp}^2} = \left(\frac{K_{dp}'}{K_{dp}}\right)^2 + 4K_{dp}^2. \quad (11)$$

At block 230, the specific differential phase can be determined from the differential propagation phase by minimizing the Lagrangian (6) for $f(r_k)$. Parameters w and q determined in blocks 225 and 235 can be used to solve the Lagrangian.

In some embodiments, the solution to the Lagrangian using (11) can provide values for constants $a_k$, $b_k$, $c_k$, and $d_k$ as:

$$b = \left[M + \frac{2}{3\lambda}QW^{-1}Q^TM^{-1}M_q\right]^{-1}Qy, \quad (12)$$

$$d = y - \frac{2}{3\lambda}W^{-1}Q^TM^{-1}M_qb, \quad (13)$$

$$a_k = \frac{2b_{k+1} - 2b_k}{6h_k}, \quad (14)$$

and $$c_k = \frac{d_{k+1} - d_k}{x_{k+1} - x_k} - \frac{b_{k+1} + 2b_k}{3(x_{k+1} - x_k)} \quad (15)$$

$k = 1 \ldots M - 1$.

Where:

$$h_k = r_{k+1} - r_k, \quad (16)$$

$$y = [f(r_1) \; f(r_2) \; \ldots \; f(r_M)]^T, \quad (17)$$

$$b = [b_1 \; b_2 \; \ldots \; b_{M-1}]^T, \quad (18)$$

$$d = [d_1 \; d_2 \; \ldots \; d_M]^T, \quad (19)$$

$$M = \begin{vmatrix} p_1 & h_1 & & & \\ h_1 & p_2 & h_2 & & \\ & h_2 & p_3 & \vdots & \\ & & \ldots & p_{M-1} & \end{vmatrix}, \quad (20)$$

$p_k = 2(h_{k-1} + h_k)$,
$h_0 = 0$, $$M_q = \begin{vmatrix} p_1 & q_1h_1 & & & \\ q_1h_1 & p_2 & q_2h_2 & & \\ & q_2h_2 & p_3 & \vdots & \\ & & \ldots & p_{M-1} & \end{vmatrix}, \quad (21)$$

$p_k = 2(q_{k-1}h_{k-1} + q_kh_k)$,
$q_0 = h_0 = 0$, $$Q = \begin{vmatrix} l_1 & u_2 & l_2 & & \\ & l_2 & u_3 & l_3 & \\ & & & \ddots & \\ & & & l_{M-1} & u_m & l_M \end{vmatrix}, \quad (22)$$

$u_k = -(l_{k-1} + l_k)$, $l_k = 3/h_k$,
and $$W = \begin{vmatrix} w_1^2 & & & \\ & w_2^2 & & \\ & & \ddots & \\ & & & w_M^2 \end{vmatrix}. \quad (23)$$

In some embodiments, the smoothing factor $\lambda$ can be chosen. Because the variation of angular $\Phi_{dp}$ has been normalized using weight factor w, a reasonable choice of $\lambda$ should be close to the expected smoothness by evaluating equation (11). As an approximation, constant $K_{dp}$ can be assumed in each range interval. At different $K_{dp}$ levels, the smoothness can be quantitatively assessed as shown in Table 1 by allowing 10% variation in $K_{dp}$. The last column can be used as a baseline for choosing $\lambda$. The existence of extra $K_{dp}$ in equation (11) can require a different smoothing factor for different peak $K_{dp}$ of expectation. For example, targeting at $K_{dp}$ of 30°/km, the smoothing factor should be around $1.1\Delta r$.

TABLE 1

Approximate quantitative evaluation of the smoothness of the cubic regression splines in single interval.

| $K_{dp}$ (°/km) | $|K'_{dp}/K_{dp}|^2$ | $(K_{dp})^2$ | $\int_{r_k}^{r_{k+1}} q^2(r)|S'_{dp}(r)|^2 dr$ |
|---|---|---|---|
| 0.1 | 0.01 | 3e-6 | $0.01\Delta r$ |
| 1 | 0.01 | 3e-4 | $0.01\Delta r$ |
| 10 | 0.01 | 3e-2 | $0.1\Delta r$ |
| 30 | 0.01 | 3e-1 | $1.1\Delta r$ |

FIG. 3 shows a process 300 for detecting storm cells from range profiles of the differential propagation phase shift data according to some embodiments. Process 300 determines whether each bin (or gate) of a set of differential propagation phase shift data contains data indicative of a rain cell or not. Process 300 moves through the differential propagation phase shift data from bin to bin to determine whether the data within the bin is indicative of rain. Process 300 evaluates the dispersion of the differential propagation phase ($\Phi_{dp}$) over a number of sequential bins according to some embodiments. Any number of sequential bins can be used, for example, in some embodiments, the number of bings can be set to 5, 10, 15, 20, 25, or 30. The dispersion of $\Phi_{dp}$ can be written as:

$$D(\Phi_{dp}) = |\langle e^{j\Phi} \rangle|. \quad (24)$$

In some embodiments, the dispersion decreases as the standard deviation of $\Phi_{dp}$ increases, for example, the dispersion approaches 1 if $\Phi_{dp}$ is highly concentrated while the dispersion approaches 0 if $\Phi_{dp}$ is uniformly distributed between 0 and $2\pi$. In some embodiments, $\Phi_{dp}$ can be assumed as a narrowly distributed Gaussian variable, and the dispersion can be derived as, $$D(\Phi_{dp}) \approx e^{-\sigma\phi^2/2}. \quad (25)$$

Process 300 starts at block 305. The counter i is initialized as being equal to zero and the initial bin status is set as being outside a rain cell. For example, a bin status variable can be used and set to indicate the data is outside a rain cell. Counter i is incremented at block 315. At block 320, process 300 determines whether a rain cell has started. A rain cell has been started, for example, if a bin status variable indicates the start of the rain cell. As another example, process 300 can look at consecutive $M_G$ bins to see if the bins were labeled as containing data indicative of a rain cell. If, as determined at block 320, a rain cell has started process 300 moves to block 325. On the other hand if a rain cell has not started, process 300 moves to block 340.

Process 300 works in the complex domain in order to avoid the effect of wrapped phase profiles. At block 325 process 300 examines the dispersion of the differential propagation phase shift data at consecutive $M_G$ bins. In some embodiments, $M_G$ can be set to 10 to suppress the impact of the statistical fluctuation. In other embodiments, $M_G$ can be set to, for example, 5, 15, 20, 25, or 30.

If the dispersion at consecutive $M_G$ bins is greater than a preset threshold value X, then process 300 labels the bins as being the start of a rain cell at block 330. In some embodiments, the bin status variable can also be set to indicate bins are inside a rain cell at block 335. In some embodiments, a rain cell array can be created with same number of data entries as the differential propagation phase shift data. The rain cell array can indicate whether a corresponding bin within the differential propagation phase shift data is within or without a rain cell. If, however, at block 325 the dispersion over a range bin is not greater than threshold value X, then process 300 returns to block 315 and moves on to the next bin.

As noted above, the dispersion is related to the standard deviation ($\sigma_\phi$) of the differential propagation phase shift. In some embodiments, a threshold value X of 0.98 can be used which corresponds to a standard deviation of about 12°. Various other threshold values can also be used. For example, Table 2 illustrates various other threshold values and their corresponding standard deviation.

TABLE 2

Values for X and Y and their corresponding standard deviation.

| X or Y | $\sigma_\phi$ |
|---|---|
| 1.000 | 1° |
| 0.999 | 2° |
| 0.999 | 3° |
| 0.998 | 4° |
| 0.996 | 5° |
| 0.995 | 6° |
| 0.993 | 7° |
| 0.990 | 8° |
| 0.988 | 9° |
| 0.985 | 10° |
| 0.982 | 11° |
| 0.978 | 12° |
| 0.975 | 13° |
| 0.971 | 14° |
| 0.966 | 15° |
| 0.962 | 16° |
| 0.957 | 17° |
| 0.952 | 18° |
| 0.947 | 19° |
| 0.941 | 20° |
| 0.935 | 21° |
| 0.929 | 22° |
| 0.923 | 23° |
| 0.916 | 24° |
| 0.909 | 25° |
| 0.902 | 26° |
| 0.895 | 27° |
| 0.887 | 28° |
| 0.880 | 29° |
| 0.872 | 30° |

At block 350 process 300 determines whether it has reached the last gate. If so, process 300 ends at block 360. Otherwise, process 300 returns to block 315 and counter i is incremented.

After a storm cell starts, the dispersion at a consecutive $M_B$ bins inside a storm cell is examined at block 340. $M_B$ can be set to 5 to suppress the impact of statistical fluctuation. In other embodiments, $M_B$ can be set to 10, 15, 20, 25, or 30. In some embodiments, $M_B$ can be equal to $M_G$. In other embodiments, $M_B$ can be less than $M_G$. If the dispersion at $M_B$ bins is less than threshold Y and the co-polar correlation coefficient ($\rho_{hv}$) is less than threshold Z, then the end of the rain cell has been reached. In some embodiments, threshold Y can be equal to threshold X. In some embodiments, threshold Y can be any value shown in the chart shown above. Co-polar correlation coefficient is a standard radar variable from a polarimetric weather radar and can be an indicator for data quality. In some embodiments, the condition of the co-polar correlation coefficient can be excluded from block 340. In some embodiments, the co-polar correlation coefficient is used within block 340 to ensure the inclusion of a complete storm cell. In some embodiments, Z can be set to 0.9. In other embodiments, Z can vary between 0.85 and 0.95.

At block 340, if the dispersion is less than Y and the co-polar correlation coefficient is less than Z, then the end of a storm cell has been reached as indicated in block 345 and process 300 moves to block 350. In some embodiments, rain status bin can be set to indicate that the data is outside a rain cell. In some embodiments, the rain cell array can indicate the corresponding range data is outside a rain cell. If, however, either or both of the conditions present in block 340 have not been met, then the data is still indicative of rain cell data and process 300 moves to block 335.

Figure 4:
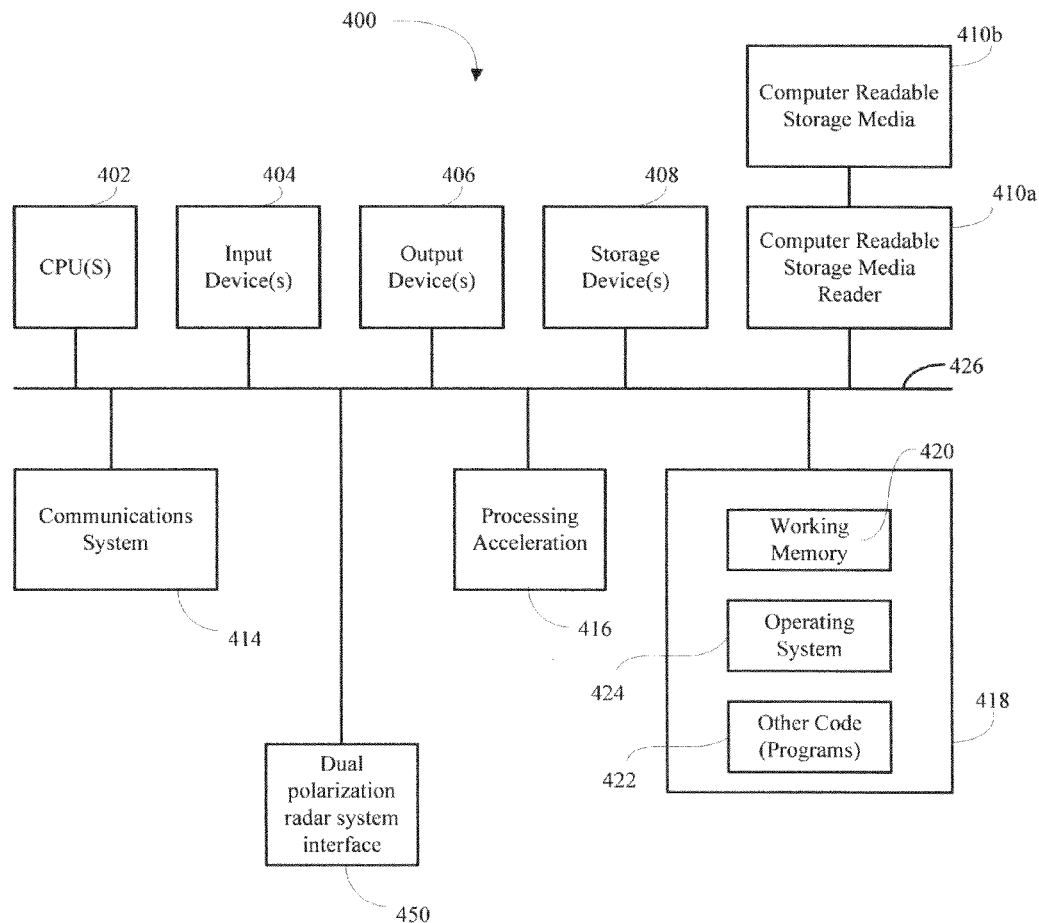
FIG. 4 shows a block diagram of a computer system that can be used to compute various aspects of the embodiments disclosed herein.

FIG. 4 shows a block diagram of a computer system 400 that can be coupled with a dual polarization radar system for computation of the specific differential phase. Computer system 400 can be used to perform any or all the computations shown in FIG. 2 and/or FIG. 3. The drawing illustrates how individual system elements can be implemented in a separated or more integrated manner. The computer 400 is shown having hardware elements that are electrically coupled via bus 426. Network interface 452 can communicatively couple the computational device 400 with another computer, for example, through a network such as the Internet. The hardware elements can include a processor 402, an input device 404, an output device 406, a storage device 408, a computer-readable storage media reader 410a, a communications system 414, a processing acceleration unit 416 such as a DSP or special-purpose processor, and memory 418. The computer-readable storage media reader 410a can be further connected to a computer-readable storage medium 410b, the combination comprehensively representing remote, local, fixed, and/or removable storage devices plus storage media for temporarily and/or more permanently containing computer-readable information.

Dual polarization radar system interface 450 is coupled with bus 426. In some embodiments, dual polarization radar system interface 450 can be any type of communication interface. For example, dual polarization radar system interface 450 can be a USB interface, UART interface, serial interface, parallel interface, etc. Dual polarization radar system interface 450 can be configured to couple directly with a dual polarization radar system The computational device 400 also comprises software elements, shown as being currently located within working memory 420, including an operating system 424 and other code 422, such as a program designed to implement methods and/or processes described herein. In some embodiments, other code 422 can include software that provides instructions for receiving user input a dual polarization radar system and manipulating the data according to various embodiments disclosed herein. In some embodiments, other code 422 can include software that can predict or forecast weather events, and/or provide real time weather reporting and/or warnings. It will be apparent to those skilled in the art that substantial variations can be used in accordance with specific requirements. For example, customized hardware might also be used and/or particular elements might be implemented in hardware, software (including portable software, such as applets), or both. Further, connection to other computing devices such as network input/output devices can be employed.

The embodiments described herein can be implemented in a real-time environment. Even though matrix inverse operations and matrix multiplication operations are involved in the solution, the computational complexity is within order of the number of range bins because all the matrices are band limited. Moreover, the calculation for unfolding wrapped phase and its propagation in the computation process are avoided.

Figure 5A:
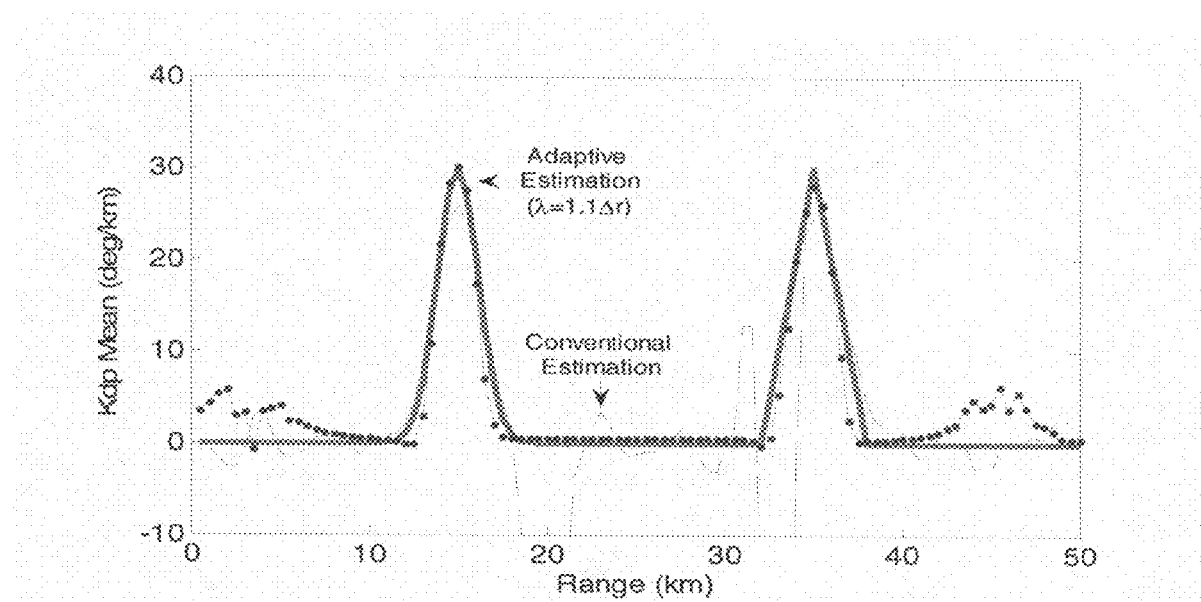
FIGS. 5A and 5B show $K_{dp}$ estimates from principal $\Phi_{dp}$ using simple finite difference (black dash line) and from angular $\Phi_{dp}$ using the adaptive technique according to some embodiments.
Figure 5B:
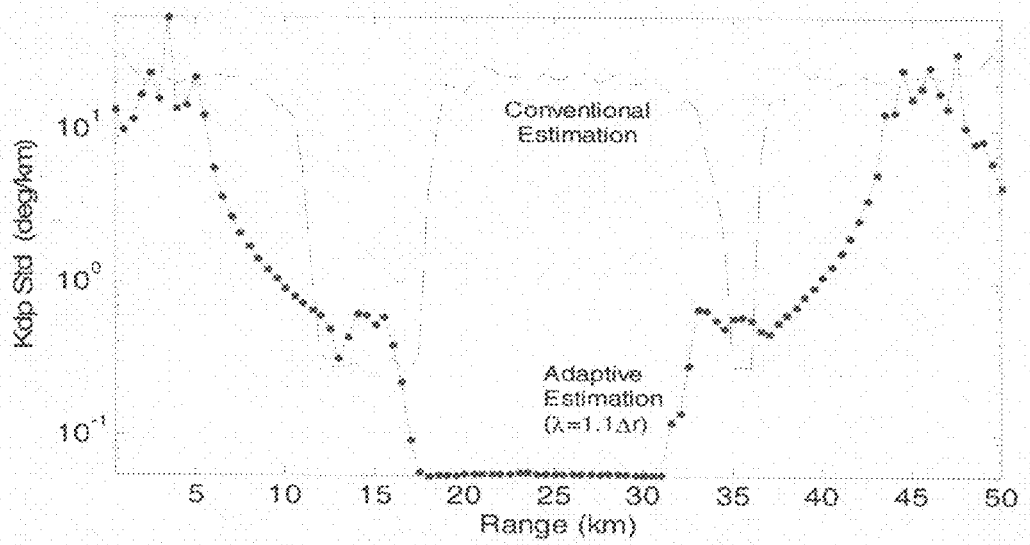

FIGS. 5A and 5B show $K_{dp}$ estimates from both the principal $\Phi_{dp}$ using simple finite difference (black dash line) and the angular $\Phi_{dp}$ using adaptive regression according to some embodiments. FIG. 5A shows the mean and FIG. 5B shows the standard deviation of estimated $K_{dp}$ based on 100 realizations. The intrinsic $K_{dp}$ profile (thick gray line) is simulated as a narrow Gaussian function (on the left side) and a triangular function (on the right side), at gate spacing of 0.5 km. Fluctuation due to noise, Doppler spread and cross polarization correlation is simulated. The adaptive estimation shows highly improved accuracy and robustness.

Figure 6:
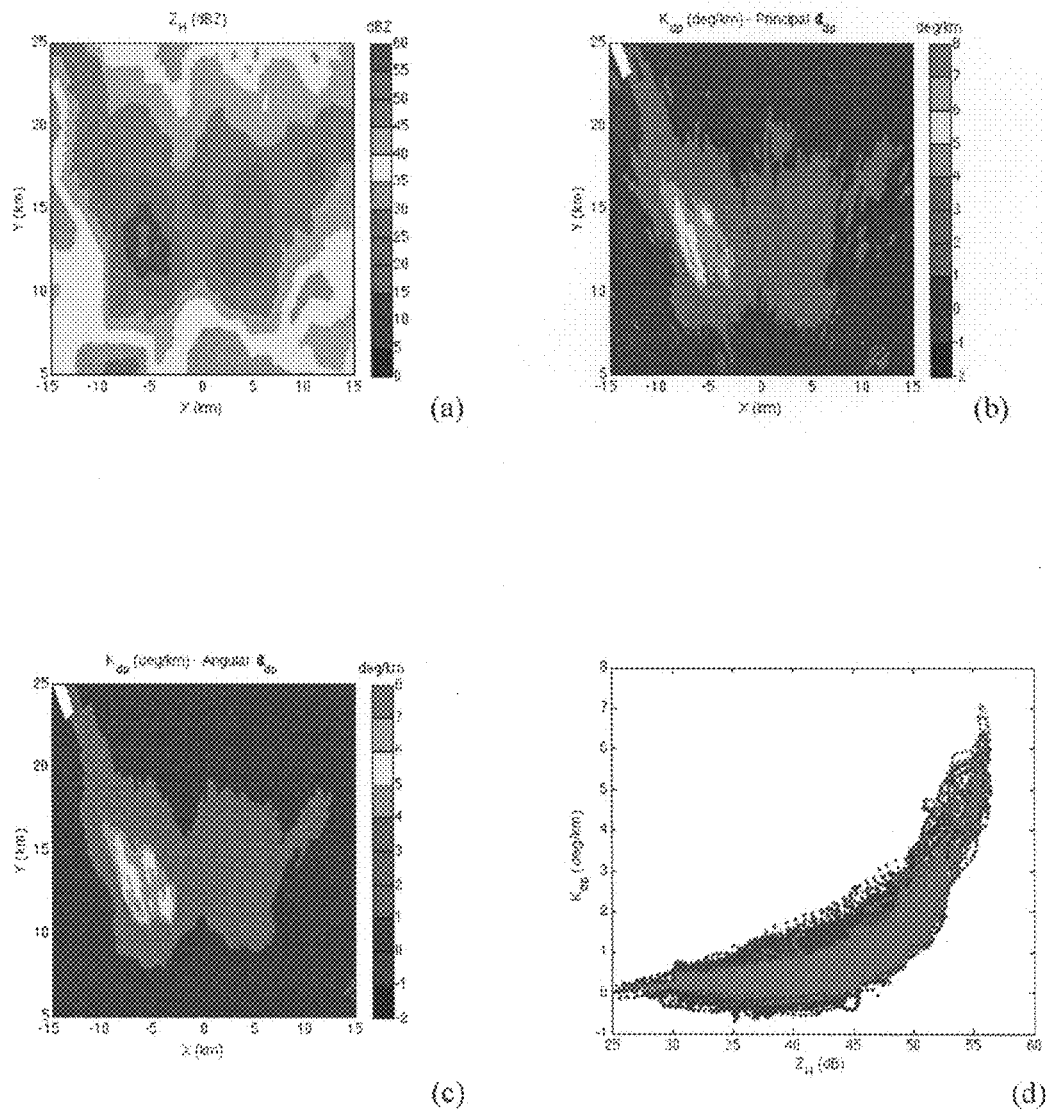
FIG. 6 shows simulated X-band radar observations and $K_{dp}$ estimates at elevation angle of 0.5° and gate spacing of 0.1 km.

FIG. 6 shows simulated X-band radar observations at elevation angle of 0.5° and gate spacing of 0.1 km. Image (a) shows a PPI plot of the attenuated reflectivity. Image (b) shows a PPI plot of the estimated $K_{dp}$ using conventional approach on the principal $\Phi_{dp}$. Image (c) shows PPI plot of the estimated $K_{dp}$ using the adaptive estimation on the angular $\Phi_{dp}$ according to some embodiments disclosed herein. Image (d) shows the scattering plot between estimates of $K_{dp}$ and intrinsic (non-attenuated) $Z_h$, where the blue points illustrate the conventional estimates and the red points illustrate the adaptive estimates. In visual comparison with the conventional approach, the adaptive approach results in similar $K_{dp}$ estimation. However, the adaptive approach does present a finer resolution which captures the peak $K_{dp}$ and the storm texture exhibited in reflectivity. At the same time, in the regions of low reflectivity, the $K_{dp}$ is much cleaner with smaller variation.

Figure 7:
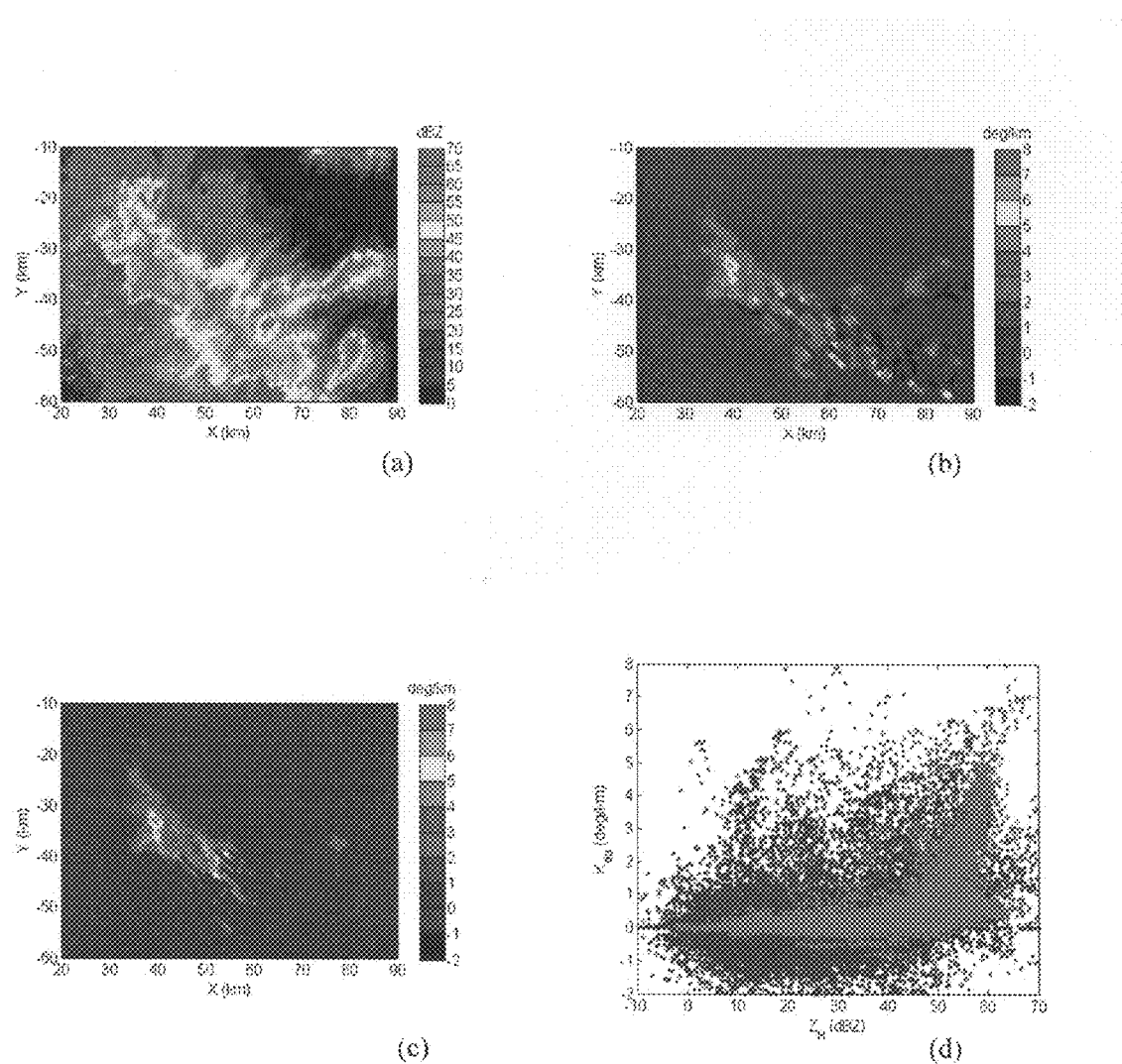
FIG. 7 shows S-band observations and $K_{dp}$ estimates from the CSU-CHILL radar for a precipitation event on May 31, 2003.

FIG. 7 shows S-band observations from the CSU-CHILL radar for a precipitation event on May 31, 2003. The $\Phi_{dp}$ is accumulated over 200° around azimuth of 128° where phase is wrapped. Same conclusion can be drawn from visual comparison (b) and (c). The $K_{dp}$ peaks are well estimated in the storm cores, while the $K_{dp}$ estimates outside of storm core are fairly smooth. At the far side of storm, $\rho_{hv}$ is very low and it is found that the data quality is not sufficient in this area. Note that the storm is located at range of 50 km and beyond. The spatial resolution there is much lower than the previous simulated cases. The scatter plot between estimated $K_{dp}$ and radar reflectivity is presented in (d). It can be seen once again the large number of extraneous points in the conventional algorithm are eliminated demonstrating the strength of the new algorithm.

Circuits, logic modules, blocks, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or digital versatile disk (DVD), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

What is claimed is:

1. A dual-polarization radar system comprising:
a dual polarization radar receiver;
a processor coupled with the receiver;
memory configured to store information including raw data received from the receiver, data processed by the processor, and processing code executable by the processor, the processing code including:
instructions to receive raw dual polarization data as a function of range from the dual polarization receiver;
instructions to determine a differential propagation phase shift as a function of range from the raw dual polarization data; and
instructions to estimate the complex specific differential phase from the differential propagation phase shift by estimating the derivative of the differential phase shift data with respect to range in the complex domain.

2. The dual-polarization system according to claim 1, wherein the instructions to estimate the complex specific differential phase further comprises solving the following Lagrangian:

$$L = \sum_{k=1}^{M-1} \left\{ \frac{4q_k^2(r_{k+1} - r_k)}{3} \left[ \frac{|b_k|^2 + |b_{k+1}|^2 +}{\text{Re}(b_k b_{k+1}^*)} \right] \right\} + \lambda \sum_{k=1}^{M} w_k^2 |f(r_k) - d_k|^2.$$

3. The dual-polarization system according to claim 2, wherein the weighting parameter $w^{-1}$ is set to the standard deviation of the measured differential phases in the complex domain.

4. The dual-polarization system according to claim 2, wherein the scaling factor $q^{-1}$ is set to reflect the varying spatial scale of the measured differential phases in adaptation to the storm intensity.

5. The dual-polarization system according to claim 2, wherein the weighting parameter $w^{-1}$ and the scaling factor $q^{-1}$ are evaluated for dual-polarization radar system.

6. The dual-polarization system according to claim 1, wherein the memory includes processing code including instructions to estimate the specific differential phase in the complex domain in response to the wrapped differential propagation phase shift.

7. The dual-polarization system according to claim 1, wherein the memory includes processing code including instructions to adapt the differential propagation phase shift data in response to spatial scale.

8. The dual-polarization system according to claim 1, wherein the memory includes processing code including instructions to adapt the differential propagation phase shift data in response to measurement fluctuations.

9. The dual-polarization system according to claim 1, wherein the memory includes processing code including instructions to identify the presence of storm cells in the differential propagation phase shift data.

10. A method for calculating the specific differential phase from the differential propagation shift between two polarizations, the method comprising:
receiving differential propagation phase shift data as a function of range in the complex domain from a dual polarization radar system;
determining the complex specific differential phase from the differential propagation phase shift data by calculating the derivative of the differential phase shift data with respect to range in the complex domain; and
converting the complex specific differential phase into the radial domain.

11. The method according to claim 10, further comprising identifying the presence of storm cells within the differential propagation phase shift data.

12. The method according to claim 11, wherein the determining the complex specific differential phase from the differential propagation phase shift data occurs only on the differential propagation phase shift data where storms cells have been identified.

13. The method according to claim 11, wherein the presence of a storm cell is identified using a dispersion of a subset of the differential propagation phase shift data.

14. The method according to claim 10, wherein the complex specific differential phase is determined by solving the following Lagrangian:

$$L = \sum_{k=1}^{M-1}\left\{\frac{4q_k^2(r_{k+1}-r_k)}{3}\left[\begin{array}{c}|b_k|^2+|b_{k+1}|^2+\\ \operatorname{Re}(b_k b_{k+1}^*)\end{array}\right]\right\} + \lambda\sum_{k=1}^{M} w_k^2|f(r_k)-d_k|^2.$$

15. The method according to claim 14, wherein the weighting parameter $w^{-1}$ is set to the standard deviation of the measured differential phases in the complex domain.

16. The method according to claim 14, wherein the scaling factor $q^{-1}$ is set to reflect the varying spatial scale of the measured differential phases in adaptation to the storm intensity.

17. The method according to claim 14, wherein the weighting parameter $w^{-1}$ and the scaling factor $q^{-1}$ are evaluated for dual-polarization radar system.

18. A method for determining the presence of storm cell from differential propagation phase shift data, the method comprising:
receiving range profiles of differential propagation phase shift data from a radar system, wherein the range profiles of differential propagation phase shift data comprises an array of differential propagation phase shift data arranged in bins corresponding to range;
when the dispersion at a first consecutive subset of bins is greater than a first threshold, indicating the first cell of the first sequential number of bins as the start of a rain cell; and
when the dispersion at a second consecutive subset of bins is less than a second threshold, indicating the first cell of the second sequential number of bins as the end of a rain cell.

19. The method according to claim 18, wherein the number of bins within the first sequential number of bins is greater than the number of bins within the second sequential number of bins.

20. The method according to claim 18, wherein the first threshold and the second threshold are the same.

21. The method according to claim 18, wherein the first threshold equals about 0.98.

22. The method according to claim 18, further comprising indicating that the bins between the first bin within the first consecutive subset of bins and the first bin within the second consecutive subset of bins as part of a rain cell.

23. The method according to claim 18, wherein the indicating the first cell of the sequential number of bins as the end of a rain cell when the dispersion at the consecutive subset of bins is less than a second threshold and the co-polar correlation coefficient of the differential propagation phase shift data is less than a third threshold.

24. The method according to claim 23, wherein the third threshold is about 0.9.

25. A system comprising:
means for receiving dual-polarization echo data from a dual polarization radar receiver;
means for determining a differential propagation phase shift as a function of range from the raw dual polarization data; and
means for determining the complex specific differential phase from the differential propagation phase shift by estimating the derivative of the differential phase shift data with respect to range in the complex domain.

26. The system according to claim 25, further comprising means for adapting the differential phase shift data for spatial scale.

27. The system according to claim 25, further comprising means for adapting the differential phase shift data for measurement fluctuations.

28. The system according to claim 25, further comprising means for determining the presence of storm cells within the differential phase shift data.

29. A dual-polarization radar system comprising:
a dual polarization radar receiver;
a processor coupled with the receiver;
memory configured to store information including raw data received from the receiver, data processed by the processor, and processing code executable by the processor, the processing code including:
instructions to determine a differential propagation phase shift as a function of range from raw dual polarization data received from the dual polarization receiver, wherein the differential propagation phase shift data comprises an array of data arranged in bins corresponding to range;
instructions for indicating the first bin of a first sequential number of bins as the start of a rain cell when the dispersion over the first sequential number of bins along a range is greater than a first threshold; and instructions for indicating the first bin of a second sequential number of bins as the end of a rain cell when the dispersion over the second sequential number of bins along a range is less than a second threshold.

30. The dual-polarization radar system according to claim 29, wherein the processing code includes instructions to indicate bins sequentially between bins identified as the start of a rain cell and bins identified as the end of a rain cell as rain cell bins.

* * * * *

UNITED STATES PATENT AND TRADEMARK OFFICE
CERTIFICATE OF CORRECTION

PATENT NO. : 7,898,459 B2  Page 1 of 1
APPLICATION NO. : 12/382000
DATED : March 1, 2011
INVENTOR(S) : Venkatachalam It is certified that error appears in the above-identified patent and that said Letters Patent is hereby corrected as shown below:

In the Detailed Description

Column 3, Line 64 equation 1 should appear as follows: $\vartheta(r) = e^{j\Phi_{dp}(r)}$ .

Column 6, Line 36 equation 8 should appear as follows:

$$w^{-2} = E\left[\left|e^{j\Phi_{dp}}\right|^2\right] - \left|E[e^{j\Phi_{dp}}]\right|^2 = 1 - \left|E[e^{j\Phi_{dp}}]\right|^2$$

Column 8, Line 55 equation 24 should appear as follows: $D(\Phi_{dp}) = \left|\langle e^{j\Phi}\rangle\right|$ .

Column 8, Line 64 equation 25 should appear as follows: $D(\Phi_{dp}) \approx e^{-\sigma_\Phi^2/2}$ .

Signed and Sealed this
Nineteenth Day of July, 2011

David J. Kappos
*Director of the United States Patent and Trademark Office*